United States Patent [19]

Burland

[11] 4,020,047
[45] Apr. 26, 1977

[54] EMERGENCY VEHICLE LIGHT

[76] Inventor: Oliver John Burland, 252 Bay Point, Naples, Fla. 33940

[22] Filed: July 11, 1975

[21] Appl. No.: 595,294

[52] U.S. Cl. .............................. 240/46.59; 240/49
[51] Int. Cl.² ......................................... F21V 9/08
[58] Field of Search ................. 240/49, 46.59, 57; 40/10 D, 16.2, 16.4, 64 R, 77

[56] References Cited

UNITED STATES PATENTS

| | | | |
|---|---|---|---|
| 1,465,244 | 8/1923 | Hager | 40/10 D UX |
| 1,972,959 | 9/1934 | Taylor | 40/16.2 |
| 3,015,897 | 1/1962 | Hopp | 40/16.2 X |
| 3,075,311 | 1/1963 | Maillette | 40/77 X |
| 3,408,624 | 10/1968 | Kennelly | 240/49 X |
| 3,757,108 | 9/1973 | Burland | 240/46.59 |
| 3,784,809 | 1/1974 | Smith | 240/49 |

Primary Examiner—Donald A. Griffin

[57] ABSTRACT

An emergency vehicle light wherein an elongated plastic globe is secured to an elongated base for mounting atop the vehicle, the globe being generally obround in plan having longitudinally extending sidewalls and hemicylindrical end walls, the sidewalls being equipped with stepped internal ribs to support placards so as to transmit different visual images than from lights within the globe.

1 Claim, 6 Drawing Figures

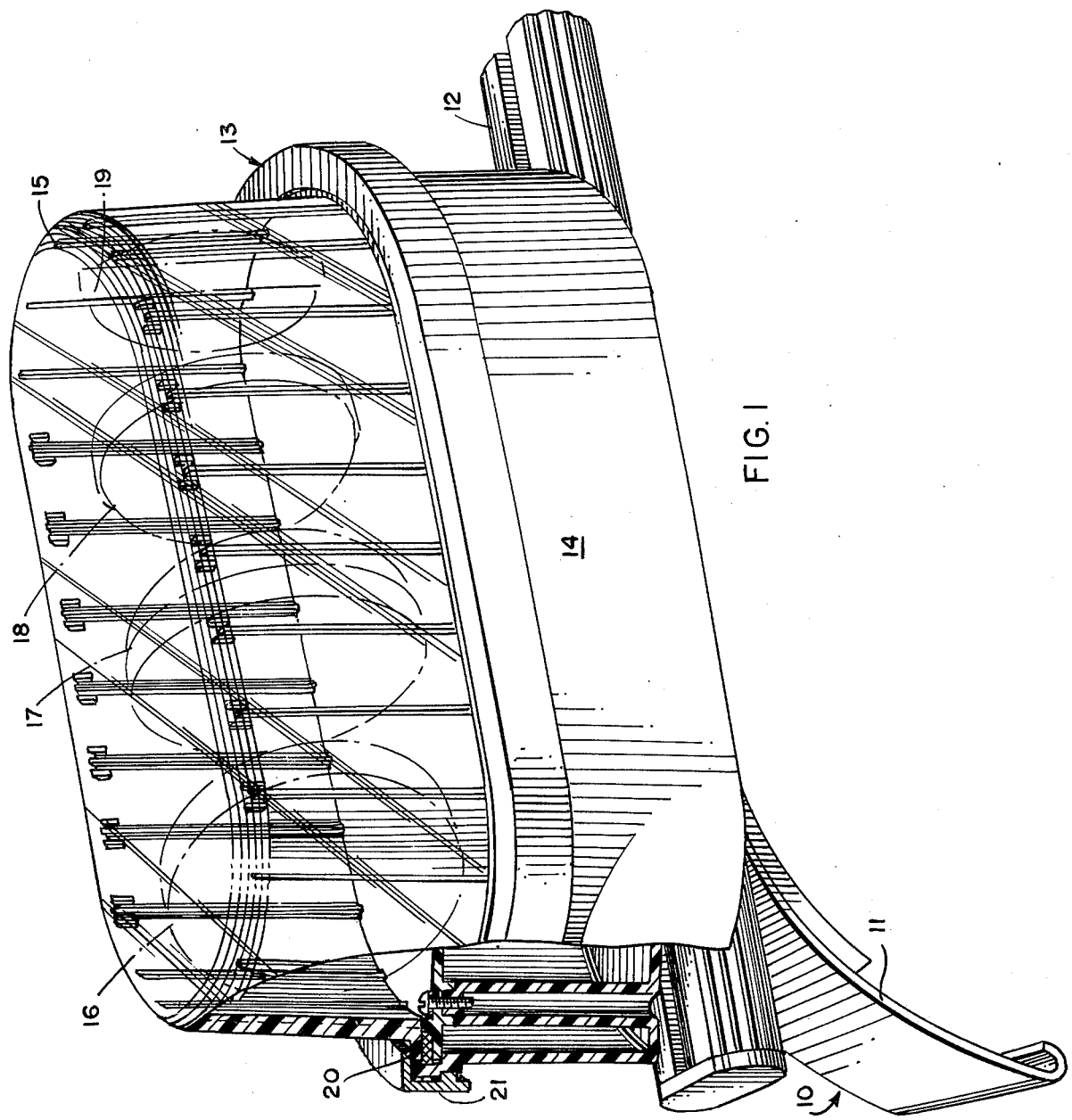

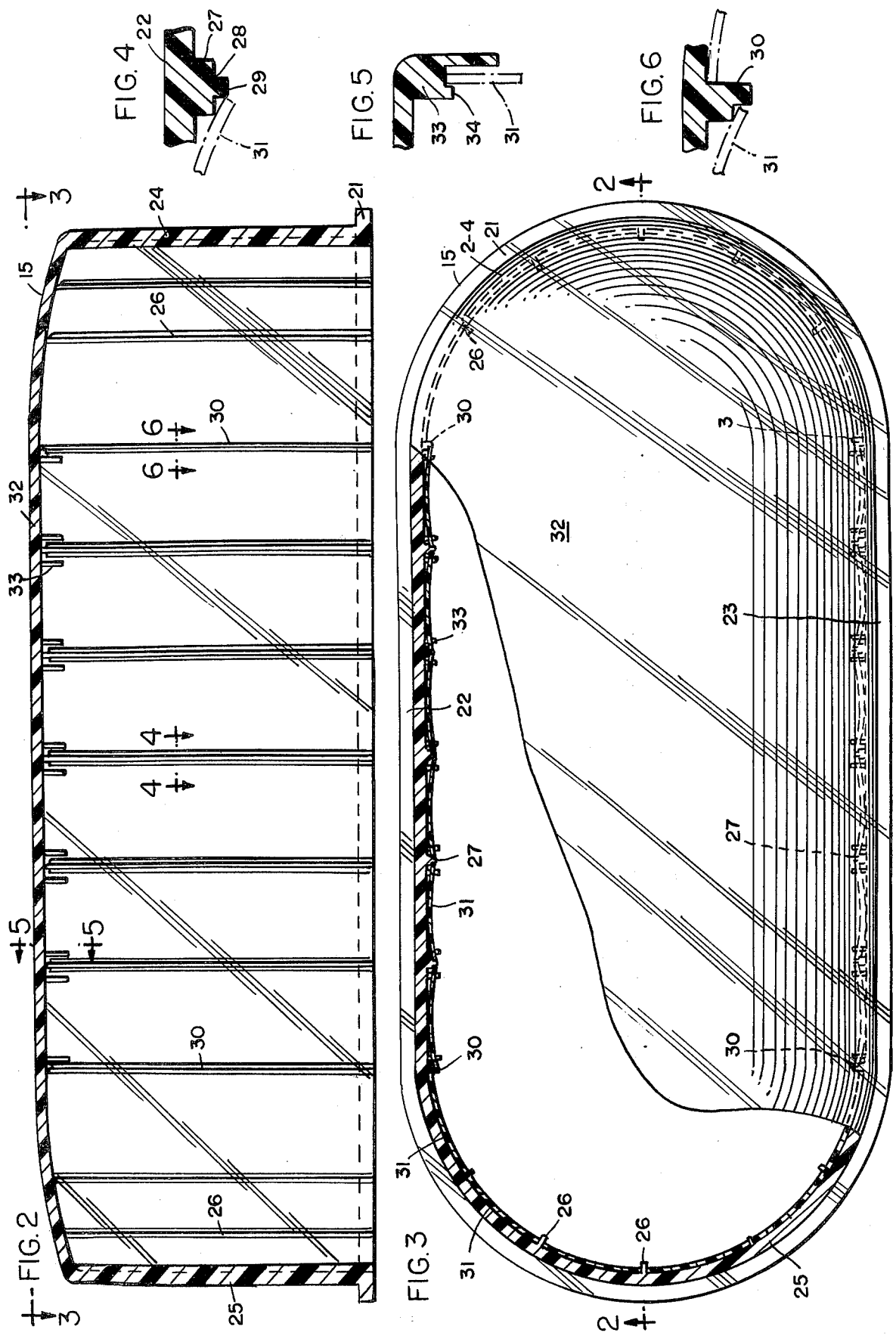

EMERGENCY VEHICLE LIGHT

BACKGROUND AND SUMMARY OF INVENTION:

This invention is an improvement on my earlier U.S. Pat. No. 3,757,108 — having to do with an elongated warning light for an emergency vehicle, such as a fire engine, police car, ambulance, etc. The above-mentioned patent shows a generally cylindrical globe equipped with internal ribs for the receipt of placards to develop different visual images. In attempting to provide an elongated globe, I experienced difficulty with maintaining the mounting of the placards. The preferred form of elongated globe was "obround", i.e., having generally flat sidewalls merging into generally hemicylindrical end walls. The placards mounted along the flat sidewalls had a tendency to dislodge upon car vibration, shock, bump, etc.

This problem of placard stability has been solved according to the instant invention through the use of a stepped rib which causes the placard to arch or belly and remain fixed in place. In addition, the stepped profile or contoured ribs develop an advantageous prism effect. Inasmuch as the globe is of a different color than the placard, usually constructed of transparent or at least translucent plastic, a white light generates a piercing beam when passing through the stepped rib as contrasted to a different color beam when passing through a placard — which may be red, blue, yellow, etc.

Further, I note that the piercing nature of the beam transmitted through the stepped rib changes as the distance from the vehicle changes. In a sense, the white beam transmitted through the rib or lens-like portion of the elongated globe becomes sharper or more piercing as the vehicle is approached which tends to reenforce the impression desired to be given an onlooker, i.e., that there is something unusual ahead and that precautions should be observed.

DETAILED DESCRIPTION

The invention is described in conjunction with an illustrative embodiment in the accompanying drawing, in which FIG. 1 is a fragmentary perspective view, partially broken away, of a warning light assembly suitable for mounting atop an emergency vehicle such as a police car;

FIG. 2 is a vertical section through what could be considered the major axis of the elongated globe and corresponds generally to what would be seen along the cross section line 2—2 of FIG. 3;

FIG. 3 is a top plan view, partially broken away and therefore in section, of a globe of FIG. 2 and corresponds generally to what would be seen from the sight line 3—3 of FIG. 2; and FIGS. 4, 5 and 6 are each fragmentary cross sectional views taken along the sight lines 4—4, 5—5, and 6—6, respectively, as applied to FIG. 2.

In the illustration given, and with reference first to FIG. 1, the numeral 10 designates generally a mounting bar assembly which is adapted for installation over the roof of an emergency vehicle. The bar assembly 10 includes a bracket 11 and a transverse bar 12, the bracket 11 being intended to be hooked into the doorway opening of an emergency vehicle (not shown). Alternatively, an assembly of the nature seen in U.S. Pat. No. 3,677,451 may be employed. In any event, an emergency warning light generally designated 13 is suitably secured to the bar assembly 10.

The emergency light 13 includes a base 14, a globe 15 and a plurality of longitudinally aligned warning lamps as at 16, 17, 18 and 19.

In the illustration given, each of the lamps 16–19 is adapted to oscillate by means (not shown) but housed within the base 13. One suitable mechanical means for oscillating the lamps 16–19 can be seen in U.S. Pat. No. 3,739,336. It will be appreciated, however, that one or more of the lamps 16–19 can be stationary and serve as a blinker in delivering a warning beam.

The globe 15 is equipped with an outwardly extending perimetric flange 20 (see the sectioned portion at the left hand of FIG. 1). This flange provides a means for mounting the globe 15 on the base 13 much in the fashion seen in U.S. Pat. No. 3,757,108. As illustrated, the globe 15 is locked to the base 14 by means of a clamping or locking ring 21. For further details of the mounting of the globe 15, reference may be made to the already mentioned U.S. Pat. No. 3,757,108 and express reference is hereby made thereto.

Turning now to the second sheet of drawings, the elongated globe 15 can be seen in longitudinal section in FIG. 2 and in partial horizontal section in FIG. 3. The globe 15 (now referring to FIG. 3) includes generally straight sidewalls 22 and 23 which merge into generally hemicylindrical end walls 24 and 25. Again, the perimetric flange is designated 21. In the illustration given, the globe 15 is constructed of transparent or translucent plastic such as a styrene polymer having substantially rigid physical characteristics. Integral with the globe 15, I provide a plurality of vertically elongated, horizontally spaced apart ribs 26 on the interior of the end walls 24 and 25. In similar fashion, ribs 27 are provided integral with the sidewalls 22 and 23. The ribs 26 are essentially rectangular in cross section (see the end portions of FIG. 3) and extend generally over the entire height of the end walls 24 and 25. The sidewall ribs 27 likewise extend over the entire height thereof, but have a different cross sectional configuration, i.e., the horizontal section being seen in FIG. 4 and is seen to be essentially "stepped", or equipped with additional shoulders as at 28 defining a central longitudianlly extending projection 29.

I provide special ribs in the transition portions of the globe, i.e., the portions wherein the sidewalls 22 and 23 merge with the end walls 24 and 25. As conveniently seen in the upper right hand portion of FIG. 3, the transitional rib 30 is stepped on only one side — see, particularly, the cross sectional view of FIG. 6. In other words, the stepping of the rib 30 is only on the side adjacent the straight sidewall 22.

Mounted between adjacent ribs (whether on the sidewalls or end walls) are placards 31 which, as mentioned previously, and in U.S. Pat. No. 3,757,108, may have different colors or visual indicia so as to create a different visual image from the beams imminating from lamps 16–19. The placards 31 mounted against the end walls 24 and 25, i.e., between the ribs 26, conform to the curvature of the sidewalls 24 and 25 and thus are stabilized by being snapped in place. By providing the stepped ribs along the sidewalls 22 and 23, i.e., with the shoulders 28 and the projections 29, I develop the same type of arching or bellying of the placards in these areas as is characteristic of the placards positioned against the end walls 24 and 25.

For example, in a specific illustration of the invention, the major axis dimension between the sidewalls 24 and 25 is 18 inches while the minor axis dimension, i.e., between the sidewalls 22 and 23 is 7 inches, and the interior height is 4¾ inches. For this arrangement, I provide the four transitional ribs 30 and provide therebetween five ribs 26 or 27, as the case may be. Each of the ribs 26 is slightly in excess of 1/32 inch in width, i.e., the horizontal dimension running parallel to the end wall 24 or 25, as the case may be, and has a dimension projecting inwardly of the globe of slightly under ⅛ inch. As illustrated, the ribs 26 and 27 all extend from the very bottom of the globe 15 to the point where the side or end walls merge with the integral top 32.

In contrast, the sidewall ribs 27 have a base width of about 1/16 inch (measured in a direction parallel with the sidewalls 22 or 23) and a width of the projection 29 of about 1/32 inch. The ribs 27 project into the interior of the globe approximately 3/16 inch and the shoulder forming step is located about 3/32 inch into the globe. To provide the transition ribs 30, I merely eliminate one of the portions providing the shoulder 28.

To provide additional stability and means for aligning the various placards, I equip the globe with interior clips as at 33. The clips 33 are associated with the sidewall ribs 27, a clip being provided for each step or shoulder 28. Thus, for the transition ribs 30, only a single rib 33 is provided whereas the double stepped ribs 27 each has a pair of clips 33 associated there with. As can be best seen from FIG. 5, the clip 33 is equipped with a hook or downward projection 34 which restrains inward movement of the placard 31.

While in the foregoing specification a detailed description of an embodiment of the invention has been set down for illustration thereof, many variations in the details hereingiven may be made without departing from the spirit and scope of the invention.

I claim:

1. In an emergency vehicle light including an elongated base adapted to be mounted on a vehicle roof and equipped with a plurality of longitudinally aligned warning lights mounted atop said base, and an elongated translucent globe mounted on said base and enclosing said lights, the improvement characterized by the fact that said globe is generally obround in plan having generally straight sidewalls and generally hemicylindrical end walls all integral with a generally flat top, a plurality of horizontally spaced apart, vertically extending ribs on the interior of said walls adapted to receive placards to transmit different visual images than from said lights alone, a plurality of placards mounted between adjacent ribs, the ribs on said sidewalls having a stepped profile in horizontal section to support the vertical edge of an associated placard away from its associated sidewall, each of said sidewall ribs having associated therewith clip means for restraining inward movement of said associated placard, said clip means being integral with said sidewalls and located adjacent the top thereof.

* * * * *